US009258522B2

(12) United States Patent
Beutter et al.

(10) Patent No.: US 9,258,522 B2
(45) Date of Patent: Feb. 9, 2016

(54) PRIVACY SETTING FOR MEDICAL COMMUNICATIONS SYSTEMS

(71) Applicants:Rick Beutter, Argyle, TX (US); Andrew J. Southworth, Coppell, TX (US); Andrew Schultz, San Diego, CA (US); Bernard S. Hirsch, Dallas, TX (US)

(72) Inventors: Rick Beutter, Argyle, TX (US); Andrew J. Southworth, Coppell, TX (US); Andrew Schultz, San Diego, CA (US); Bernard S. Hirsch, Dallas, TX (US)

(73) Assignee: STRYKER CORPORATION, Kalamazoo, MI (US)

( * ) Notice: Subject to any disclaimer, the term of this patent is extended or adjusted under 35 U.S.C. 154(b) by 0 days.

(21) Appl. No.: 14/198,826

(22) Filed: Mar. 6, 2014

(65) Prior Publication Data
US 2014/0267582 A1  Sep. 18, 2014

Related U.S. Application Data

(60) Provisional application No. 61/790,853, filed on Mar. 15, 2013.

(51) Int. Cl.
  *A61B 5/00* (2006.01)
  *H04N 7/14* (2006.01)
(52) U.S. Cl.
  CPC ............ *H04N 7/147* (2013.01); *H04N 2201/00* (2013.01)
(58) Field of Classification Search
  CPC ... A61B 5/0006; A61B 5/0013; A61B 5/7232
  USPC ...................................... 600/301; 348/14.01
  See application file for complete search history.

(56) References Cited

U.S. PATENT DOCUMENTS

| | | |
|---|---|---|
| 5,375,068 A | 12/1994 | Palmer et al. |
| 5,740,278 A | 4/1998 | Berger et al. |
| 5,991,881 A | 11/1999 | Conklin et al. |
| 6,003,991 A | 12/1999 | Viirre |
| 6,449,001 B1 | 9/2002 | Levy et al. |
| 6,564,380 B1 | 5/2003 | Murphy |
| 6,731,324 B2 | 5/2004 | Levy |
| 6,944,136 B2 | 9/2005 | Kim et al. |
| 7,257,158 B1 | 8/2007 | Figueredo et al. |
| 7,593,032 B2 | 9/2009 | Civanlar et al. |
| 7,692,683 B2 | 4/2010 | Kenoyer et al. |
| 7,734,684 B2 | 6/2010 | Zeng et al. |

(Continued)

OTHER PUBLICATIONS

Internet Printout from Wikipedia, "Do Not Disturb (telecommunications)," known more than one year before the filing date of the present application.

(Continued)

*Primary Examiner* — Creighton Smith
(74) *Attorney, Agent, or Firm* — Flynn, Thiel, Boutell & Tanis, P.C.

(57) ABSTRACT

A communication arrangement including a room having at least one communication device therein, the at least one communication device receiving in-room images, in-room video and/or in-room audio within the room. The communication arrangement also includes a communication system for transmitting the in-room images, in-room video and/or in-room audio from within the room to a location remote from the room. The communication system has a privacy setting that, when activated, prevents viewing of the in-room images or in-room video and/or hearing of the in-room audio from within the room at the location remote from the room and communicates to the location remote from the room that the privacy setting is activated.

30 Claims, 3 Drawing Sheets

(56) References Cited

U.S. PATENT DOCUMENTS

| | | |
|---|---|---|
| 7,945,616 B2 | 5/2011 | Zeng et al. |
| 8,004,572 B2 | 8/2011 | Figueredo et al. |
| 8,159,519 B2 | 4/2012 | Kurtz et al. |
| 8,194,116 B2 | 6/2012 | Cook |
| 8,209,398 B2 | 6/2012 | Moorer et al. |
| 8,279,260 B2 | 10/2012 | Civanlar et al. |
| 8,401,869 B2 | 3/2013 | Renzi et al. |
| 8,477,173 B2 | 7/2013 | Kenoyer et al. |
| 2006/0158509 A1 | 7/2006 | Kenoyer et al. |
| 2007/0050828 A1 | 3/2007 | Renzi et al. |
| 2007/0220165 A1 | 9/2007 | Moorer et al. |
| 2008/0159180 A1 | 7/2008 | Civanlar et al. |
| 2008/0159384 A1 | 7/2008 | Civanlar et al. |
| 2008/0211901 A1 | 9/2008 | Civanlar et al. |
| 2008/0239062 A1 | 10/2008 | Civanlar et al. |
| 2008/0249376 A1* | 10/2008 | Zaleski .................. 600/301 |
| 2009/0164575 A1 | 6/2009 | Barbeau et al. |
| 2009/0189972 A1 | 7/2009 | Harris et al. |
| 2009/0295905 A1 | 12/2009 | Civanlar et al. |
| 2010/0097441 A1* | 4/2010 | Trachtenberg et al. .... 348/14.08 |
| 2010/0118113 A1 | 5/2010 | Cook |
| 2012/0320146 A1 | 12/2012 | Civanlar et al. |
| 2013/0014266 A1* | 1/2013 | Yeung .................. 726/26 |
| 2013/0201273 A1 | 8/2013 | Renzi et al. |
| 2015/0077502 A1* | 3/2015 | Jordan et al. ............. 348/14.03 |

OTHER PUBLICATIONS

SwitchPoint Infinity® 1 Control System, Stryker® Operations Manual, 2006 (46 pages).

* cited by examiner

PRIVACY SETTING FOR MEDICAL COMMUNICATIONS SYSTEMS

CROSS REFERENCE TO RELATED APPLICATION

This application claims the benefit of U.S. Provisional Application Ser. No. 61/790,853, filed Mar. 15, 2013, which is incorporated herein by reference in its entirety.

FIELD OF THE INVENTION

This invention relates generally to a communication system and, more particularly, to a privacy setting for a communication system.

BACKGROUND OF THE INVENTION

Privacy in medical facilities is very important to patients along with being legally mandated by the Health Insurance Portability and Accountability Act of 1996 in some situations. In many medical facilities, cameras capture images of rooms and communication is made using teleconferencing, video conferencing and video broadcasts. There is a desire to ensure that privacy is maintained during teleconferencing, video conferencing and video broadcasts.

SUMMARY OF THE INVENTION

An aspect of the present invention is to provide a communication arrangement including a room having at least one communication device therein, with the at least one communication device receiving in-room images, in-room video and/or in-room audio within the room. The communication arrangement also includes a communication system for transmitting the in-room images, in-room video and/or in-room audio from within the room to a location remote from the room. The communication system has a privacy setting that, when activated, prevents viewing of the in-room images or in-room video or hearing of the in-room audio from within the room at the location remote from the room and communicates to the location remote from the room that the privacy setting is activated.

Another aspect of the present invention is to provide a method of communicating between a room and a location remote from the room comprising providing the room with at least one communication device therein, receiving in-room images, in-room video and/or in-room audio within the room with the at least one communication device, providing a communication system for transmitting the in-room images, in-room video and/or in-room audio from within the room to a location remote from the room, providing the communication system with a privacy setting, preventing viewing of the in-room images or in-room video or hearing of the in-room audio from within the room at the location remote from the room when the privacy setting is activated, allowing viewing of the in-room images or in-room video or hearing of the in-room audio from within the room at the location remote from the room when the privacy setting is not activated, and communicating to the location remote from the room that the privacy setting is activated when the privacy setting is activated.

Yet another aspect of the present invention is to provide a communication arrangement comprising a room having at least one communication device therein, with the at least one communication device receiving in-room images, in-room video and/or in-room audio within the room. The communication arrangement also includes a communication system for transmitting the in-room images, in-room video and/or in-room audio from within the room to a plurality of locations remote from the room. The communication system has a privacy setting that, when activated, prevents viewing of the in-room images or in-room video or hearing of the in-room audio from within the room at any of the locations remote from the room by a request initiated from any of the locations remote from the room.

DETAILED DESCRIPTION OF PREFERRED EMBODIMENTS

For purposes of description herein, it is to be understood that the invention may assume various alternative orientations, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
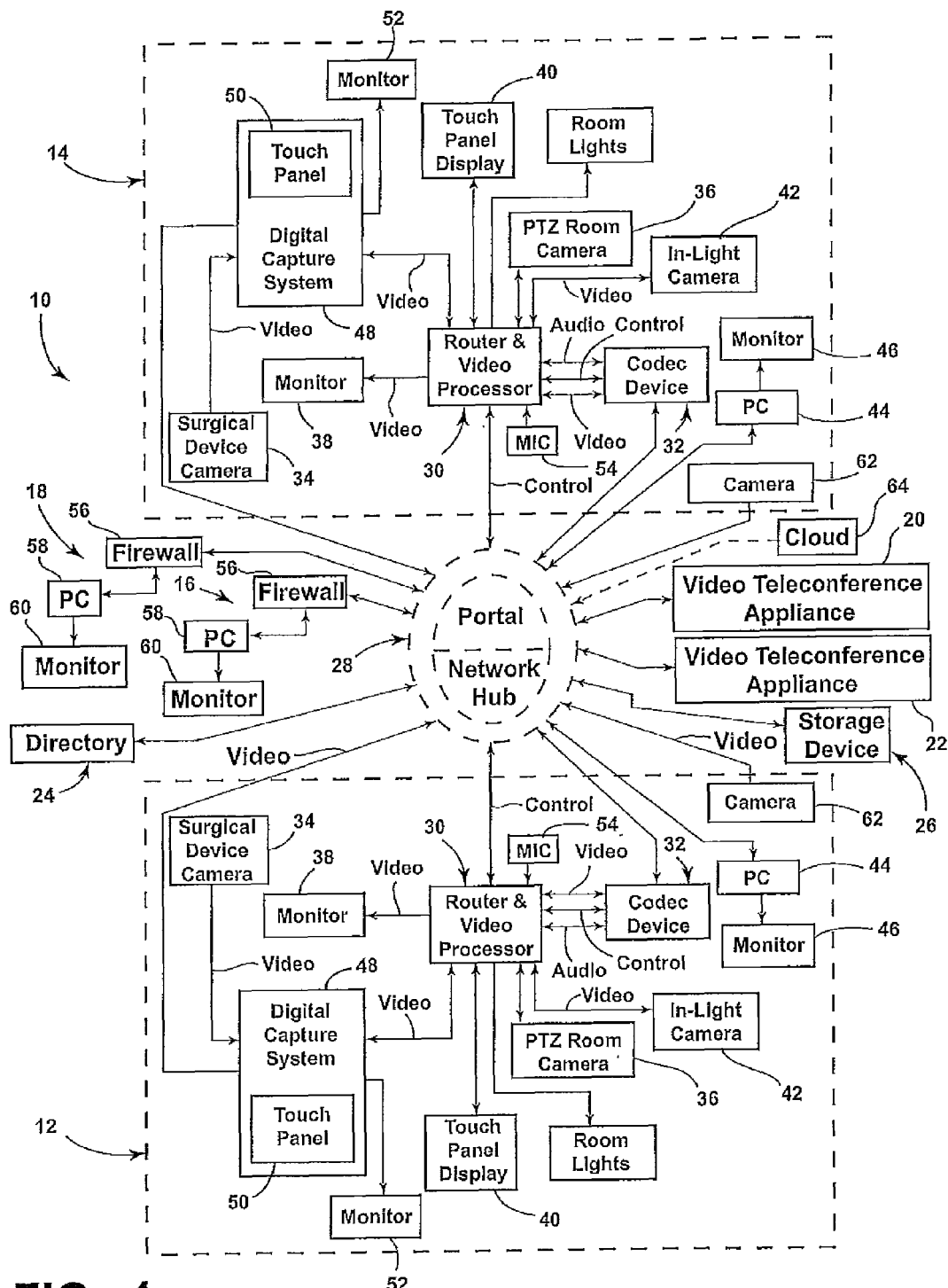
FIG. 1 is a schematic view of a teleconferencing and broadcasting system of the present invention.

FIG. 1 illustrates a teleconferencing and broadcasting system 10 embodying the present invention. FIG. 1 shows a first medical room 12, a second medical room 14, a first personal computing system 16, a second personal computing system 18, a first video teleconferencing appliance 20, a second video teleconferencing appliance 22, a directory 24 and a storage device 26, all connected to each other through a network hub and portal system 28. The teleconferencing and broadcasting system 10 allows the first medical room 12, the second medical room 14, the first personal computing system 16, the second personal computing system 18, the first video teleconferencing appliance 20, and the second video teleconferencing appliance 22 to selectively communicate with each other. While a first medical room 12 and a second medical room 14 are shown, it is contemplated that any number of medical rooms (including only one medical room) could be engaged with the network hub and portal system 28. Furthermore, while the first personal computing system 16 and the second personal computing system 18, are shown, it is contemplated that any number of personal computing systems (including only one personal computing system) could be engaged with the network hub and portal system 28. Moreover, while the first video teleconferencing appliance 20 and the second video teleconferencing appliance 22 are shown, it is contemplated that any number of video teleconferencing appliances (including only no or one video teleconferencing appliance) could be engaged with the network hub and portal system 28. It is contemplated that the video conference appliances could be offsite codecs to provide support for video-conferencing at offsite locations. It is noted that all the communications between the network hub and portal system 28 and the medical rooms can take place over a local area network (LAN), with the communications between any of the video teleconference appliances 20, 22 also taking place over the LAN. Alternatively, it is contemplated communications with any of the video teleconference appliances 20, 22 can take place over the internet.

In the illustrated example, the first medical room 12 and/or the second medical room 14 could be an operating room wherein a medical procedure could be taking place. Alternatively, the first medical room 12 and/or the second medical room 14 could be other rooms in a medical facility (e.g., pathology lab, hospital conference room, hospital training room, diagnosis room or patient room). The first personal computing system 16 and the second personal computing system 18 could be located anywhere (e.g., inside a medical facility (and connected to the LAN) or elsewhere). Likewise, the first video teleconferencing appliance 20 and the second video teleconferencing appliance 22 could be located anywhere (e.g., inside a medical facility or elsewhere).

Each of the illustrated first medical room 12 and the second medical room 14 can include a plurality of communication and diagnostic devices therein. The first medical room 12 and the second medical room 14 can include a media router and video processor 30. The media router and video processor 30 can include software and hardware that includes support for a codec device 32 and that interacts with the network hub and portal system 28. The media router and video processor 30 can also include an integrated or separate control system for controlling the media router and video processor 30. The media router and video processor 30 includes a video processor for processing video signals sent to and received from the codec device 32. Further, the media router and video processor 30 can receive video streams including a video stream from a surgical device camera 34 (e.g., a camera of an endoscope), stream from a pan-tilt-zoom (PTZ) room camera 36 located within the first medical room 12 and the second medical room 14, and a stream from an in-light video camera 42 located within a surgical lighting device of the first medial room 12 and the second medical room 14. The media router and video processor 30 can select a video stream that is sent to the codec device 32 connected thereto for broadcast over the LAN or Internet (via the network hub and portal system 28). Further, the media router and video processor 30 can scale up or down video signals received thereat. For example, high definition (HD) video signals can be scaled down to standard definition video signals. The media router and video processor 30 also controls a position of the PTZ room camera 36 located in the medical room. The first medical room 12 and the second medical room 14 can include a monitor 38 and/or a touch panel display 40 upon which are selectively displayed: camera images or video streams received from the surgical device camera 34, from the in-light video camera 42 or from the PTZ room camera 36 located in the same medical room. Further, external video streams received via another codec device 32 can be displayed on the monitor 38 connected to the media router and video processor 30. An example of the media router and video processor 30 can be the SWITCHPOINT INFINITY® 3 system of the Assignee hereof. An example of a control system for the media router and video processor 30 can be the SWITCHPOINT INFINITY® 3 control system of the Assignee hereof.

In the illustrated example, the codec device 32 encodes video and audio streams received from the media router and video processor 30 and transmitting same over a network, such as the LAN or the Internet, for use by other viewing devices. The codec device 32 can simultaneously output H.264 encoded video streams having different resolutions 720p, 480p or can output a single 1080i video stream. The illustrated codec device 32 is also capable of receiving and outputting high definition video streams, such as 1080i, 720p, 480p at appropriate band widths for streaming to multiple devices. Furthermore, the codec device 32 can decode and decompress an encoded audio and video stream received from another codec device 32 unit over the network. The codec device 32 provides a decoded video stream from the network to the media router and video processor 30 for use and display thereby. The codec device 32 is capable of simultaneously encoding and compressing video signals received from the media router and video processor 30 for output over the network, while decoding and decompressing video streams received over the network from a different codec device 32.

Internet protocols of the illustrated codec device 32 include as application layers Real-Time Transport Protocol (RTP), RTP control protocol (RTCP) and Real-Time Streaming Protocol (RTSP) for the video stream; and secure shell (SSH) for secured communication. As for transport layers, the codec device 32 can use Real-Time Transport Control Protocol (TCP) as a transport layer for SSH and User Datagram Protocol (UDP) as a transport layer for RTP, RTCP and RTSP application layers. The codec device 32 can include an encoder that time stamps data packets and determines a sleep time for each data packet.

The illustrated codec device 32 can encode real-time video streams using the MPEG-4 AVC (H.264) standard and can encode audio streams utilizing the AAC standard. The codec device 32 can also perform data encryption and decryption. The codec device 32 encoders and decoders can include multiple microprocessors and hardware circuitry that perform video and audio signal processing. The codec device 32 can include converters, RS-232 connections, audio, USB and Ethernet ports or connectors for both the encoder and decoder. The codec device 32 can receive a DVI-D video stream from the media router and video processor 30 and convert same to an HDMI signal. The codec device 32 can convert the HDMI signal and an audio signal to an SDI signal that is provided to at least one encoder. The codec device 32 encoders can receive an RS-232 control signal from the media router and video processor 30 to compress and encode the SDI signal. The encoders can output an encrypted video stream to the network or "cloud" in H.264 format over a RJ45 ethernet connection.

The encoders of the illustrated codec device 32 can perform data compression of the video stream and audio stream while encoding the streams. Depending on the control signals provided to the encoder by the media router and video processor 30, the codec device 32 may output an encrypted compressed video stream having a 1080i resolution and an audio stream. A different control signal from the media router and video processor 30 enables the codec device 32 to encode and output a pair of video streams having different resolutions 720p, 480P simultaneously. The encoder can utilize the same codec or algorithm for encoding and compressing the video and audio streams regardless of the chosen video resolution. The 720p video stream can be output as a RTSP unicast transport stream and the 480p video stream can be output as a multi-cast UDP stream.

The illustrated codec device 32 can include decoders that operate in a reverse manner to the encoder. In operation, a decoder of the codec device 32 receives an encrypted encoded, compressed digital video and audio stream provided in H.264 format by another codec device 32 via the network or from a "cloud" 64 as passed along by the network hub and portal system 28. The selected decoder can decrypt and decode the received H.264 video stream and audio stream into an SDI signal. The SDI signal is provided to a SDI to HDMI converter that outputs an HDMI signal and an audio stream. Then, the HDMI video signal is converted into a DVI-D format and output along with the audio stream to the media router and video processor 30 for display. With regard to incoming video streams, the selected decoder may be configured to only decode an incoming compressed, encoded video stream received from another codec device 32. The decoder can be selected depending on the resolution of the encoded video stream received or chosen for processing. The decoders can operate using the same codec as the encoder.

In the illustrated example, the network hub and portal system 28 can be installed on a network server and can provide status information and details, such as IP addresses, that may be required for the codec devices 32 to communicate with each other. The network hub and portal system 28 can maintain a list of codec devices 32 available in a network and can enable one-to-one communication between codec devices 32. The network hub and portal system 28 can also maintain a list of video streams and auxiliary video streams for reading and display by personal computers (PCs) 58 having monitors 60 disposed at various remote locations or the PCs 44 having monitors 46 within the first medical room 12 and/or a second medical room 14 provided with the media router and video processor 30. Audio streams can be provided with each of the video streams.

The illustrated network hub and portal system 28 can also provide a web based portal for enabling a plurality of PCs to make calls and teleconference with other PCs, which may include the PC 44 located in the first medical room 12 and/or a second medical room 14 with the media router and video processor 30 for use therewith. Users of the PC 44 or 58 can interact with the network hub and portal system 28 through their web browsers/web pages. The network hub and portal system 28 authenticates users and allows them to browse the video streaming list for PCs and the video streams of the codec system 32. For example, users of PCs 44, 58 on a hospital network can browse video stream lists, select a stream to view and watch the video stream. The network hub and portal system 28 may combine up to a plurality of video streams, including a plurality of video signals from the codec device 32, for transmission as a single video image composition to various display devices. Thus, a plurality of video streams can be multi-viewed on the monitors 46, 60 for teleconferencing. The display devices may include PCs with web cams that output their own video stream, and other PC devices that can only select and watch video streams. The network hub and portal system 28, via the media router and video processor 30, can allow a remote user with the PC 58 to remotely control the PTZ room camera 36. Further, the network hub and portal system 28 can allow a remote user of the PC 58 to view, after control selection at the media router and video processor 30 of an output by a corresponding codec device 32, a video stream from one of the PTZ room cameras 36, the surgical device camera 34 or the in-light camera 42.

In the illustrated example, the PC 44 and the monitor 46 are provided in a room with the media router and video processor 30 for teleconferencing. The PC 44 can receive a web page with plural video streams directed by the network hub and portal system 28 that the PC 44 displays on the monitor 46. Furthermore, the network hub and portal system 28 can direct selected audio streams to the PC 44. Thus, the PC 44 can provide multi-view images to enable teleconferencing for a user that is also operating the media router and video processor 30 connected to the codec device 32 in the same medical room 12, 14. The PC 44 and the monitor 46 can obtain HD codec video stream from the codec device 32 over the network via the network hub and portal system 28.

The illustrated first medical room 12 and the second medical room 14 can include a digital capture device 48 that captures and records video streams or still images from the surgical device camera 34. The digital capture device 48 can include a touch panel 50 (which can be a display or can include a display 52 in addition to the touch panel 50). A user can change video compression and other properties of the digital capture device 48. The digital capture device 48 can save video to a disc or provide same to the IP network as a unicast video stream having UDP type packets and a variable bitrate. Image storage and video operations can be controlled by a wireless hand-held remote control, a surgical device camera head button, or the touch panel 50. The digital capture device 48 can broadcast video streams over the network.

In the illustrated example, the remote storage device 26 can be connected to the hospital network for providing stored video streams to PCs 44, 58 for viewing. The remote storage device 26 can obtain and store video streams output by the digital capture device 48. An in-room camera 62 can provide video from the first and second medical rooms 12, 14 over the medical facility network or Internet so that users at a remote location may determine the status of the medical room 12, 14. The in-room camera 62 can connect directly to the hospital network. A firewall 56 can be provided between the hospital network and remote PCs 58 or other remote devices on an IP network.

In the illustrated example, it may be desirable to protect patient privacy in one of the medical rooms 12, 14. For example, it may be desirable to protect patient privacy during a medical procedure (e.g., when the medical rooms 12, 14 are operating rooms). To allow for patient privacy, the teleconferencing and broadcasting system 10 may include a privacy setting for the medical rooms 12, 14. The privacy setting in the medical rooms 12, 14 can be activated in any manner. For example, the privacy setting can be activated through a graphical user interface on the touch panel display 40 connected to the media router and video processor 30 in the medical room 12, 14. The privacy setting for the medical rooms 12, 14 could also be activated using voice control received by a microphone connected to the media router and video processor 30 or by a gesture control captured by a camera in the room (e.g., the in-light video camera 42) and identified by the media router and video processor 30 connected to the camera. It is contemplated that any combination of the graphical user interface on the touch panel display 40 (or any other interface in the room 12, 14), the voice control and the gesture control could be used. Once the privacy setting is activated, communication (e.g., video signals) from the room 12, 14 is limited.

Figure 2:
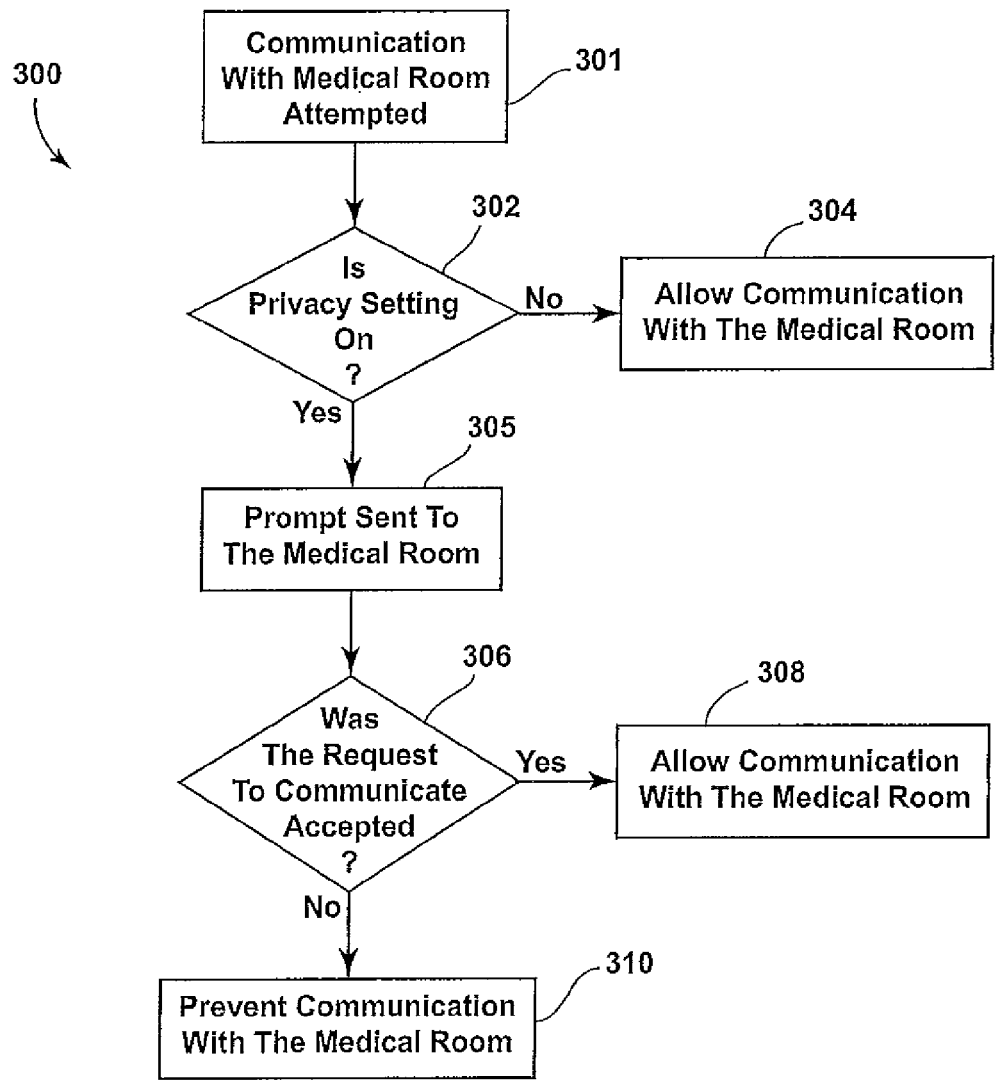
FIG. 2 is a flow chart illustrating a method of using a privacy setting of the teleconferencing and broadcasting system of the present invention.

FIG. 2 illustrates a method 300 of using a privacy setting of the teleconferencing and broadcasting system 10 of the present invention. In the discussion that follows, the first medical room 12 is considered to be the room having the privacy setting capabilities. However, any of the medical rooms could have the privacy setting capabilities. In the method 300, a person remote from the first medical room 12 attempts to communicate with the first medical room 12 by viewing images from the in-room camera 62 (or multiple in-room cameras 62), from the surgical device camera 34 (or multiple surgical device cameras 34), from the PTZ room camera 36 (or multiple PTZ room cameras 36), from the in-light video camera 42 (or multiple in-light video cameras 42) or from any other image taken in the room or by speaking with the people in the first medical room using a microphone 54 (or other microphones (e.g., in a telephone)) at step 301.

Once communication is attempted at step 301, the method 300 determines if the privacy setting is activated at step 302. If the privacy setting is not activated, the method 300 proceeds to step 304 where the person remote from the first medical room 12 is able to view images from the first medial room 12 and/or speak with people in the first medical room 12. If the privacy setting is activated, a prompt can be sent to a monitor or display in the first medical room 12 (e.g., touch panel display 40 or monitor 46 connected to the PC 44) at step 305 notifying the people in the first medical room 12 that the person remote from the room is attempting to open communications (e.g., teleconference or videoconference) with the first medical room 12. The prompt at step 305 can include an audible signal or alert to notify the people in the first medical room 12 that communication is being requested. It is contemplated that only teleconference or videoconference requests can be made, and not broadcasting requests. If the people in the first medical room 12 accept the request for communication at step 306, thereby turning off the privacy setting, the method 300 continues to step 308 wherein the person remote from the first medical room 12 is able to view images from the first medial room 12 and/or speak with people in the first medical room 12. It is contemplated that the privacy setting could only be temporarily disabled for the single communication and can be automatically enabled once the single communication is ended. It is further contemplated that the people in the first medical room 12 can accept the invitation to communicate by activating or touching the prompt on the monitor or display in the first medical room (e.g., touching a "Touch to Accept" icon). If the people in the first medical room 12 do not accept the request for communication at step 306, thereby maintaining the privacy setting, the method 300 continues to step 310 wherein the person remote from the first medical room 12 is not able to open communications with the first medical room 12. It is contemplated that step 306 having the request to begin communications could include a default that moves to step 310 to maintain the privacy setting if the prompt is not activated within a certain time period. In the illustrated example, it is contemplated that all communications emanating from the first medical room 12 can be immediately terminated when the privacy setting is activated. It is contemplated that the privacy setting could be activated for a certain time (e.g., depend on the procedure taking place in the medical room), and then automatically deactivated.

Figure 3:
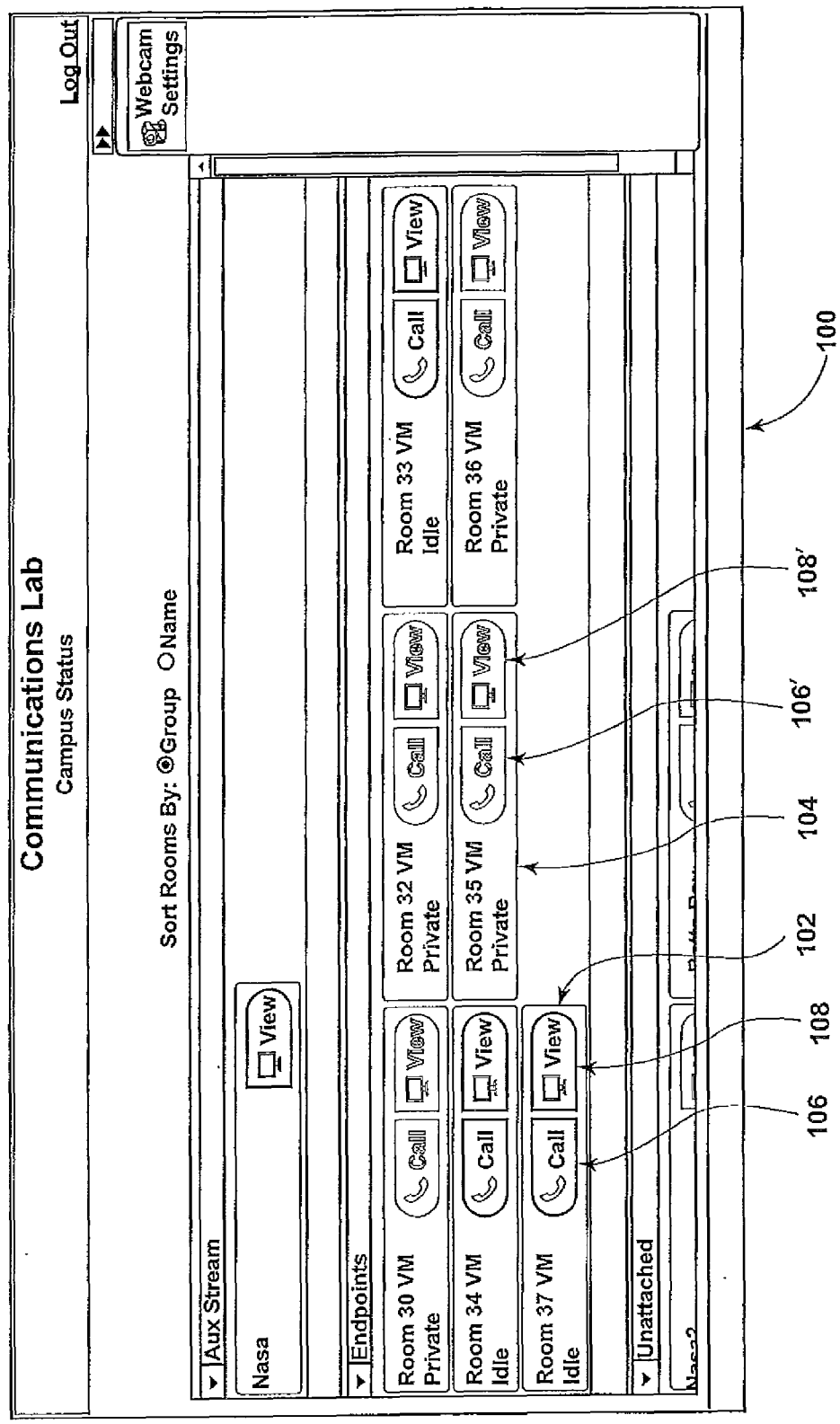
FIG. 3 is a screen image illustrating use of the privacy setting of the teleconferencing and broadcasting system of the present invention.

FIG. 3 is a screen image 100 illustrating use of the privacy setting of the teleconferencing and broadcasting system 10 of the present invention. The screen image 100 can be shown on a monitor or display in any of the medical rooms 12, 14 (e.g., touch panel display 40, monitor 38 or monitor 46 connected to the PC 44), or on the monitor 60 connected to the PC 58 or on any monitor within or outside of the medical facility. The screen image 100 shows a status of various rooms in the medical facility. For example, portion 102 of the screen image 100 shows a status of a first medical room ("Room 37") in the medical facility and portion 104 of screen image 100 shows a status of a second medical room ("Room 35). The portion 102 of the first medical room ("Room 37") shows that the room is open with the privacy setting off ("Idle") and portion 104 shows that the second medical room ("Room 35") shows that the room with the privacy setting on ("Private"). It is contemplated that all of the rooms of the medical facility can be found in the directory 24 interacting with the network hub and portal system 28.

In the illustrated example, both portions 102 and 104 of the screen image 100 include icons for calling 106 or viewing 108 the first and second medical rooms. If the room is open or does not have the privacy setting on ("Idle"), calls will go through to the room when the call icon 106 is activated and the room can be viewed with the view icon 108 is activated. If the room has the privacy setting on, the call icon 106' and the view icon 108' can be in another color (e.g., grey or orange) or otherwise indicated as not being able to be directly activated, thereby preventing calls from being made to the medical room or from being able to view the medical room. As outlined above, a prompt can be sent to the medical room asking for communication and/or viewing when the call icon 106' and the view icon 108' are activated. It is contemplated that the items in the medical room can be controlled (e.g., controlling the PTZ room camera 36 remotely when the privacy setting is not activated). It is also contemplated that the video streams from other cameras can be displayed as part of the teleconferencing and broadcasting system 10.

It is to be understood that variations and modifications can be made on the aforementioned embodiments without departing from the concepts of the present invention. For example, it is contemplated all images taken from the first and second medical rooms 12, 14 could be viewed on mobile or portable devices connected to the network hub and portal system 28. Furthermore, it is contemplated that all video could be sent in any format, including H.264, webcam, SIP, H.323, HLS and others. Additionally, it is contemplated that the privacy setting could prevent other communications, such as switching on privacy glass to the medical room to make the glass opaque to viewers outside of the medical room, controlling the PTZ room camera 36 to face a wall or turning the PTZ room camera 36 off, and disabling viewing of any electronic protected health information in all related software applications outside of the medical room. It is also contemplated that the privacy setting could remove all patient information from any video, images or files that are recorded or transmitted outside of the room (along with preventing communication or as a standalone feature). It is further contemplated that the privacy setting could be conditional such that it could only be activated when one or more conditions (or attributes) are met or that the privacy setting could be partially turned on to allow some communications (e.g., teleconference), but not all communications (e.g., not allowing images or video to be sent from the room). Moreover, it is to be understood that such concepts are intended to be covered by the following claims unless these claims by their language expressly state otherwise.

We claim:

1. A communication arrangement comprising:
    a room having at least one communication device therein, the at least one communication device receiving at least one of in-room images, in-room video and in-room audio within the room; and
    a communication system for transmitting the at least one of in-room images, in-room video and in-room audio from within the room to a location remote from the room;
    the communication system having a privacy setting that, when activated, prevents at least one of viewing of the in-room images, viewing of the in room video and hearing of the in-room audio captured from the room at the location remote from the room and communicates to the location remote from the room that the privacy setting is activated;
    wherein activation of the privacy setting causes privacy glass in the room to become opaque to viewers outside of the room.

2. The communication arrangement of claim 1, wherein:
    the communication system receives at least one of remote images, remote video and remote audio from within the location remote from the room; and the privacy setting, when activated, prevents at least one of viewing of the remote images, viewing of the remote video and hearing of the remote audio from within the location remote from the room at the room.

3. The communication arrangement of claim 2, wherein:
the privacy setting, when not activated, allows at least one of viewing of the in-room images, viewing of the in-room video and hearing of the in-room audio from within the room at the location remote from the room and communicates to the location remote from the room that the privacy setting is not activated.

4. The communication arrangement of claim 3, wherein:
the privacy setting, when not activated, allows at least one of viewing of the remote images, viewing of the remote video and hearing of the remote audio from within the location remote from the room at the room.

5. The communication arrangement of claim 1, wherein:
the at least one communication device includes at least one camera for receiving the in-room images and in-room video.

6. The communication arrangement of claim 5, wherein:
the at least one camera comprises a plurality of cameras.

7. The communication arrangement of claim 5, wherein:
the communication system allows for control of the at least one camera within the room by a user in the location remote from the room.

8. The communication arrangement of claim 1, wherein:
the communication system allows for a user in the location remote from the room to request that the privacy setting be temporarily deactivated by providing a prompt to a display in the room.

9. The communication arrangement of claim 8, wherein:
the privacy setting is temporarily deactivated by accepting the request that the privacy setting be temporarily deactivated.

10. The communication arrangement of claim 9, wherein:
the privacy setting remains activated by declining the request that the privacy setting be temporarily deactivated.

11. A method of communicating between a room and a location remote from the room comprising:
providing the room with at least one communication device therein;
receiving at least one of in-room images, in-room video and in-room audio within the room with the at least one communication device;
providing a communication system for transmitting the at least one of the in-room images, the in-room video and the in-room audio from within the room to a location remote from the room;
providing the communication system with a privacy setting;
preventing at least one of viewing of the in-room images, viewing of the in-room video and hearing of the in-room audio from within the room at the location remote from the room when the privacy setting is activated;
allowing at least one of viewing of the in-room images, viewing of the in-room video and hearing of the in-room audio from within the room at the location remote from the room when the privacy setting is not activated;
communicating to the location remote from the room that the privacy setting is activated when the privacy setting is activated; and
causing privacy glass in the room to become opaque to viewers outside of the room upon activation of the privacy setting.

12. The method of claim 11, further including:
receiving at least one of remote images, remote video and remote audio from within the location remote from the room in the communication system; and
preventing at least one of viewing of the remote images, viewing of the remote video and hearing of the remote audio from within the location remote from the room at the room when the privacy setting is activated.

13. The method of claim 12, further including:
allowing at least one of viewing of the in-room images, viewing of the in-room video and hearing of the in-room audio from within the room at the location remote from the room when the privacy setting is not activated; and
communicating to the location remote from the room that the privacy setting is not activated when the privacy setting is not activated.

14. The method of claim 13, further including:
allowing at least one of viewing of the remote images, viewing of the remote video and hearing of the remote audio from within the location remote from the room at the room when the privacy setting is not activated.

15. The method of claim 11, further including:
providing the at least one communication device with at least one camera for receiving at least one of the in-room images and the in-room video.

16. The method of claim 15, wherein:
the at least one camera comprises a plurality of cameras.

17. The method of claim 15, further including:
remotely controlling the at least one camera within the room from the location remote from the room.

18. The method of claim 11, further including:
allowing a user in the location remote from the room to request that the privacy setting be temporarily deactivated by providing a prompt to a display in the room.

19. The method of claim 18, further including:
temporarily deactivating the privacy setting by accepting the request that the privacy setting be temporarily deactivated.

20. The method of claim 19, further including:
maintaining the privacy setting as activated by declining the request that the privacy setting be temporarily deactivated.

21. A method of communicating between a room and a location remote from the room comprising:
providing the room with at least one communication device therein;
receiving at least one of in-room images, in-room video and in-room audio within the room with the at least one communication device;
providing a communication system for transmitting the at least one of the in-room images, the in-room video and the in-room audio from within the room to a location remote from the room;
providing the communication system with a privacy setting;
preventing at least one of viewing of the in-room images, viewing of the in-room video and hearing of the in-room audio from within the room at the location remote from the room when the privacy setting is activated;
allowing at least one of viewing of the in-room images, viewing of the in-room video and hearing of the in-room audio from within the room at the location remote from the room when the privacy setting is not activated;
communicating to the location remote from the room that the privacy setting is activated when the privacy setting is activated; and removing all patient information from all video, image and files being recorded or transmitted when the privacy setting is activated.

22. The method of claim 21, further including:
receiving at least one of remote images, remote video and remote audio from within the location remote from the room in the communication system; and
preventing at least one of viewing of the remote images, viewing of the remote video and hearing of the remote audio from within the location remote from the room at the room when the privacy setting is activated.

23. The method of claim 21, further including:
allowing at least one of viewing of the in-room images, viewing of the in-room video and hearing of the in-room audio from within the room at the location remote from the room when the privacy setting is not activated; and
communicating to the location remote from the room that the privacy setting is not activated when the privacy setting is not activated.

24. The method of claim 21, further including:
allowing at least one of viewing of the remote images, viewing of the remote video and hearing of the remote audio from within the location remote from the room at the room when the privacy setting is not activated.

25. The method of claim 21, further including:
providing the at least one communication device with at least one camera for receiving at least one of the in-room images and the in-room video.

26. The method of claim 21, wherein:
the at least one camera comprises a plurality of cameras.

27. The method of claim 21, further including:
remotely controlling the at least one camera within the room from the location remote from the room.

28. The method of claim 21, further including:
allowing a user in the location remote from the room to request that the privacy setting be temporarily deactivated by providing a prompt to a display in the room.

29. The method of claim 21, further including:
temporarily deactivating the privacy setting by accepting the request that the privacy setting be temporarily deactivated.

30. The method of claim 21, further including:
maintaining the privacy setting as activated by declining the request that the privacy setting be temporarily deactivated.

* * * * *